(12) United States Patent
Cushing et al.

(10) Patent No.: US 10,277,060 B1
(45) Date of Patent: Apr. 30, 2019

(54) INDUCTIVE WIRELESS CHARGING STATION

(71) Applicant: TESSCO Communications Incorporated, Hunt Valley, MD (US)

(72) Inventors: Andrew Benjamin Cushing, Baltimore, MD (US); John Barry, Salo (FI); Cheryl Jenner, Ellicott City, MD (US)

(73) Assignee: TESSCO COMMUNICATIONS INCORPORATED, Hunt Valley, MD (US)

( * ) Notice: Subject to any disclaimer, the term of this patent is extended or adjusted under 35 U.S.C. 154(b) by 0 days.

(21) Appl. No.: 15/792,354

(22) Filed: Oct. 24, 2017

(51) Int. Cl.
| | |
|---|---|
| *H02J 7/00* | (2006.01) |
| *H02J 7/02* | (2016.01) |
| *H04B 5/00* | (2006.01) |
| *H01F 38/14* | (2006.01) |

(52) U.S. Cl.
CPC .............. *H02J 7/025* (2013.01); *H01F 38/14* (2013.01); *H02J 7/0044* (2013.01); *H04B 5/0037* (2013.01)

(58) Field of Classification Search
CPC .......... H01F 38/14; H02J 7/0044; H02J 7/025

USPC ......................................................... 320/108
See application file for complete search history.

(56) References Cited

U.S. PATENT DOCUMENTS

| | | | |
|---|---|---|---|
| 7,211,986 B1* | 5/2007 | Flowerdew et al. | H02J 7/025 320/108 |
| 7,715,187 B2 | 5/2010 | Hotelling et al. | |
| D727,259 S | 4/2015 | Hwang | |
| D738,823 S | 9/2015 | Chen | |
| 9,276,625 B2 | 3/2016 | Jing et al. | |
| 9,325,196 B2 | 4/2016 | Park et al. | |
| 9,600,034 B2* | 3/2017 | Kiple et al. | |
| 9,627,918 B2 | 4/2017 | Chen et al. | |
| D786,791 S | 5/2017 | Jeong et al. | |
| 2015/0097519 A1 | 4/2015 | Chen | |
| 2016/0211696 A1 | 7/2016 | Park et al. | |
| 2016/0239053 A1* | 8/2016 | Kiple et al. | G06F 1/1626 |
| 2016/0241076 A1* | 8/2016 | Bowers et al. | G06F 1/1632 |
| 2017/0077728 A1 | 3/2017 | Fluckiger et al. | |

\* cited by examiner

*Primary Examiner* — Sun J Lin
(74) *Attorney, Agent, or Firm* — Shlesinger, Arkwright & Garvey LLP

(57) ABSTRACT

A stand and charging coil housing comprises a base; a frame removably attached to the base; and a housing for a charging coil. The housing is removably attached to the frame.

14 Claims, 5 Drawing Sheets

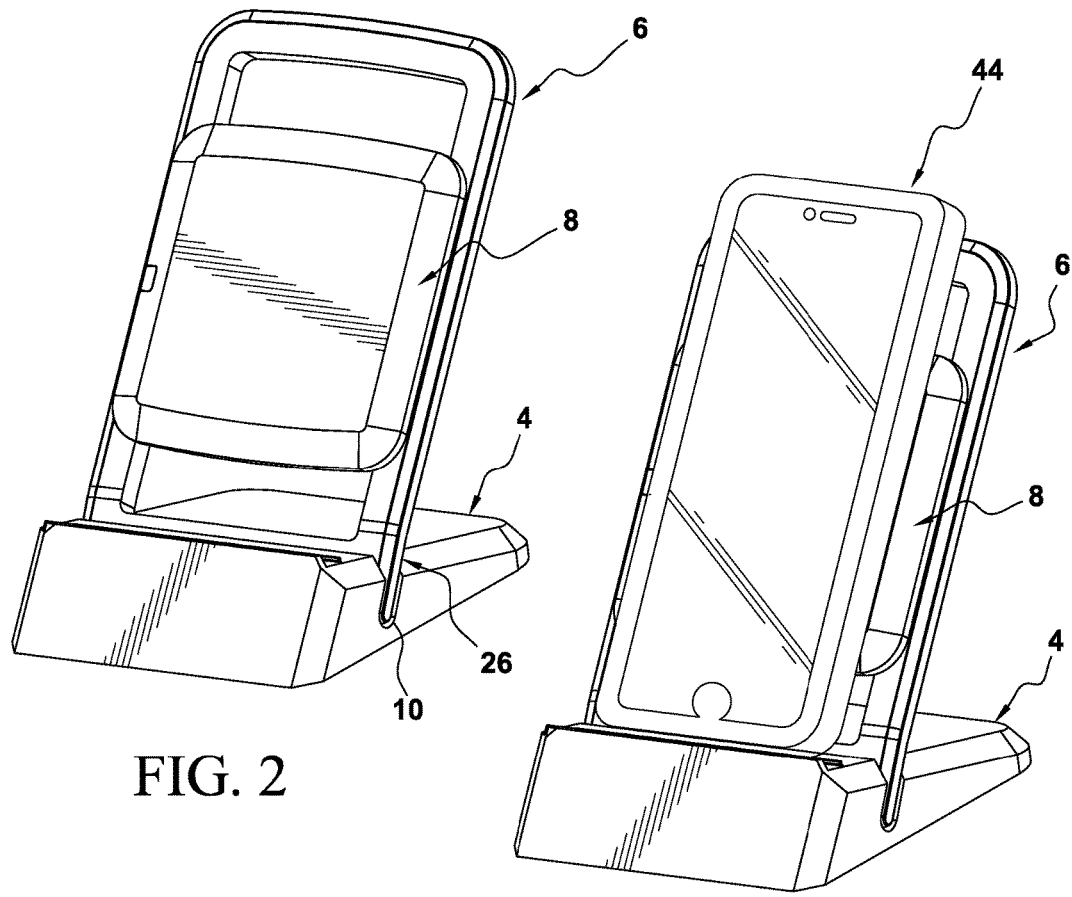
FIG. 2
FIG. 3
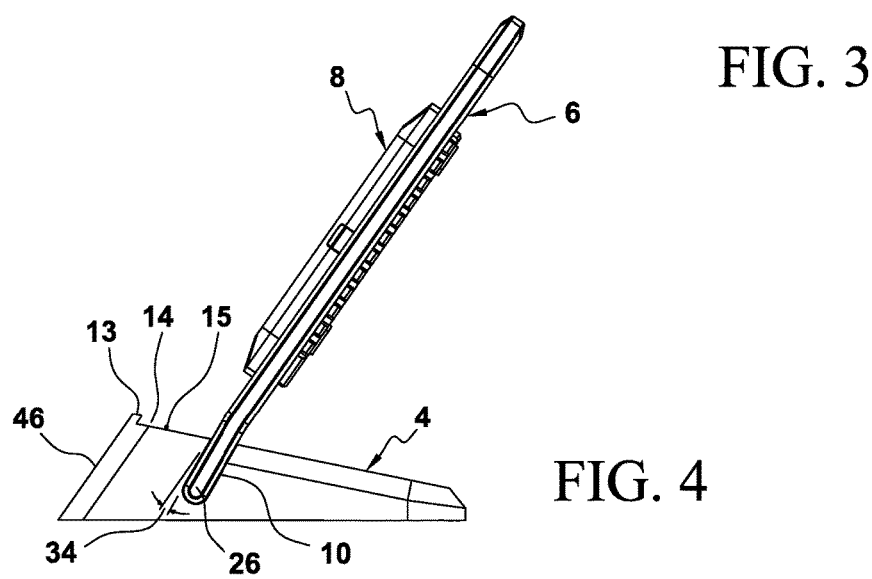
FIG. 4

INDUCTIVE WIRELESS CHARGING STATION

FIELD OF THE INVENTION

The present invention is generally directed to an inductive wireless charging station for a portable electronic device.

SUMMARY OF THE INVENTION

The present invention provides a stand and charging coil housing, comprising a base; a frame removably attached to the base; and a housing for a charging coil, the housing is removably attached to the frame.

The present invention also provides an inductive wireless charging station for a portable electronic device, comprising a stand including a base and a frame removably attached to the base; a housing removably attached to the frame; a transmitter coil for coupling with a receiver coil in the portable electronic device, the transmitter coil is disposed in the housing; and a power source operably connected to the transmitter coil.

BRIEF DESCRIPTION OF THE DRAWINGS

FIG. 2 is a front perspective view of the inductive wireless charging station shown in FIG. 1.

FIG. 3 is a front perspective view of the inductive wireless charging station shown in FIG. 2 with a portable electronic device being wirelessly charged.

FIG. 4 is a side view of FIG. 2.

DETAILED DESCRIPTION OF THE INVENTION

Figure 1:
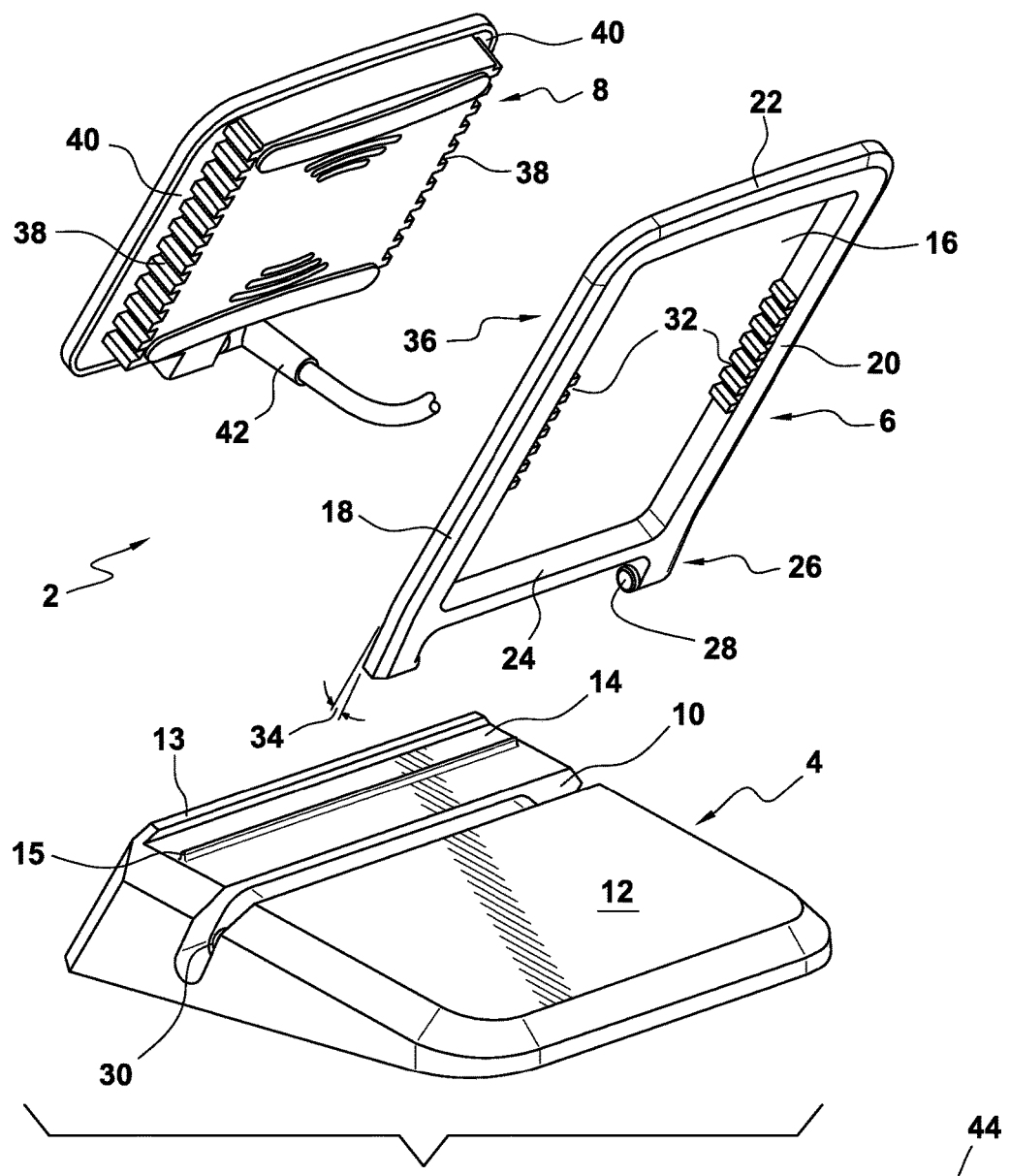
FIG. 1 is an assembly view of an inductive wireless charging station for a portable electronic device embodying the present invention.

Referring to FIG. 1, an inductive wireless charging station 2 embodying the present invention is disclosed. The charging station 2 includes a base 4, a frame 6, which is removably attached to the base 4 and a charging coil housing 8, which is removably attached to the frame 6.

The base 4 is preferably wedge-shaped. A slot 10, preferably U-shaped, is disposed below a top surface 12. A groove 14 with a front wall 13 and a rear wall 15 is disposed above the top surface 12. The base 4, preferably rectangular, advantageously provides a stable support to the frame 6 and the housing 8.

The frame 6 has an opening 16 bounded by vertical members 18 and 20 and upper and lower members 22 and 24. A bottom portion 26, preferably U-shaped, of the frame 6 is removably attachable to the slot 10. Buttons 28 are receivable in respective depressions 30 inside the slot 10 for positive locking of the frame 6 inside the slot 10. A series of vertical grooves 32 facing inside the opening 16 is disposed on the respective vertical members 18 and 20. The bottom portion 26 of the frame 6 is disposed at an angle 34 with respect to the upper portion 36.

The housing 8 has a left and right side with respective series of vertical grooves 38, which are meshable with the respective grooves 32 of the frame 6. Flanges 40 are disposed adjacent the grooves 38 to advantageously provide a positive stop when the housing 8 is attached to the frame 6. The housing 8 is selectively vertically positionable within the opening 16 to advantageously raise or lower the housing. An electric cord 42 is attached to the housing 8 to connect to a charging coil inside the housing 8. The electric cord 42 operably connects to a power source independently of the frame 6 and the base 4 so that the housing 8 can be positioned flat on a flat surface, such as a desktop, countertop, etc.

Referring to FIG. 2, the charging station 2 is shown assembled, with the frame 6 attached to the base 4 and the housing 8 to the frame 6. The bottom portion 26 is received within the slot 10.

Referring to FIG. 3, a portable electronic device 44, such as a cellphone, is shown resting against the housing 8. The electronic device 44 has an internal receiver coil (not shown) inductively coupled to a transmitter coil (not shown) inside the housing 8. When the charging station 2 is powered, power from the transmitter coil is transferred to the receiver coil, charging the battery (not shown) inside the device 44. The device 44 is advantageously tilted toward the frame 6 for stability. The bottom portion of the device 44 is advantageously received within the groove 14 to securely hold the device 44 in place while being charged.

Referring to FIG. 4, the frame 6 is shown tilted away from the front 46 to provide a stable position for the device 44 during charging. The slot 10 is located near the front 46 for stability against rotation of the base 4 when the device 44 is resting against the housing 8. The angle 34 provides additional inclination to the frame 6 to present the face of the device 44 while being charged to a user at suitable angle. The front wall 13 of the groove 10 advantageously prevents the device 44 from sliding toward front while tilted against the housing 8 when being charged.

Figures 5, 6:
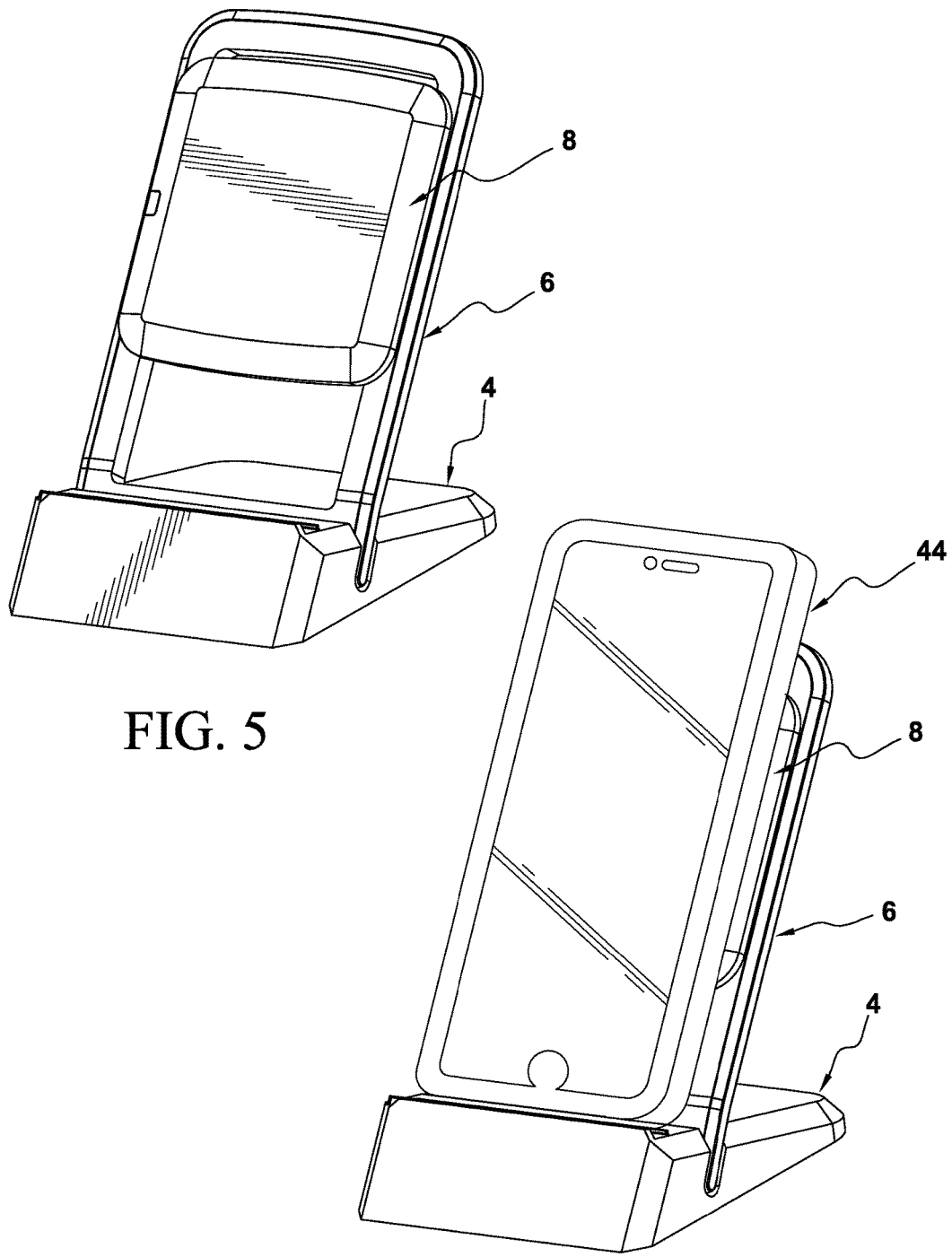
FIG. 5 is the same view as FIG. 2, but showing the coil housing at a higher position.
FIG. 6 is a front perspective view of the inductive wireless charging station shown in FIG. 5 with a portable electronic device being wirelessly charged.

Referring to FIGS. 5 and 6, the housing 8 is shown at a higher position than in FIG. 2. The vertically selectively positionable capability of the housing 32 on the frame 8 is made possible by the series of vertical grooves 38 on the housing 8 and the series of vertical grooves 32 on the frame 6. The vertical adjustability of the housing 8 advantageously allows the user to properly position the transmitter coil in the housing 8 to align with the receiver coil in the device 44.

Figure 7:
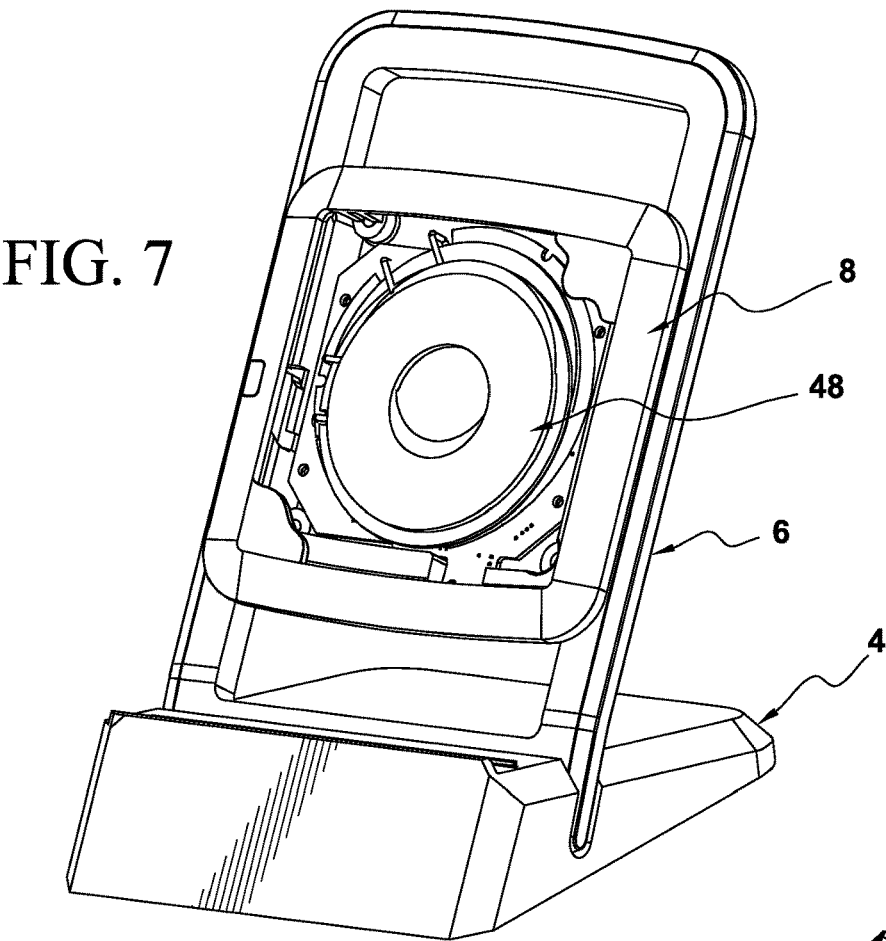
FIG. 7 is a front perspective view of the inductive wireless charging station with the front cover of the coil housing broken away to show the coil assembly.

Referring to FIG. 7, a front panel of the housing 8 is shown broken away to show an exemplary transmitter coil assembly 48 inside the housing 8. The coil assembly 48 is of standard manufacture.

Figure 8:
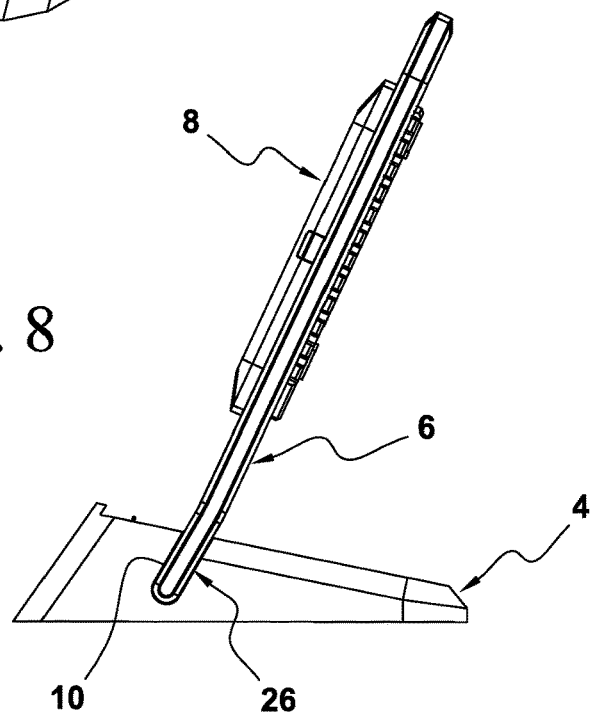
FIG. 8 is a side view of the inductive wireless charging station with the coil housing configured at a different orientation.

Referring to FIG. 8, the frame 6 is shown rotated 180° from the position shown in FIG. 4 to tilt the frame 6 toward the user, if needed to provide a more comfortable viewing for the user while looking at the face of the device 44 resting on the housing 8 while being charged.

Figure 9:
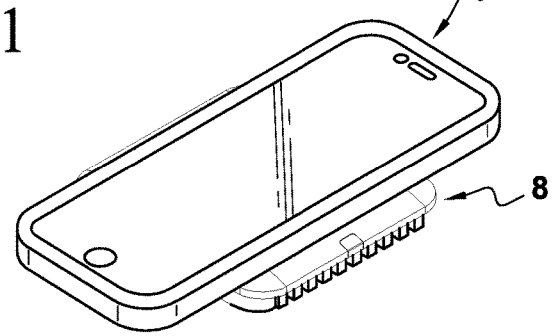
FIG. 9 is a perspective view of the coil housing separated from the charging station, shown with a portable electronic device being charged.

Referring to FIG. 9, the housing 8 is shown detached from the frame 6, with the device 44 resting on top of the housing 8 while being charged. The housing 8 may be placed on a flat surface, such as a desktop, countertop, tabletop, etc.

Figure 10:
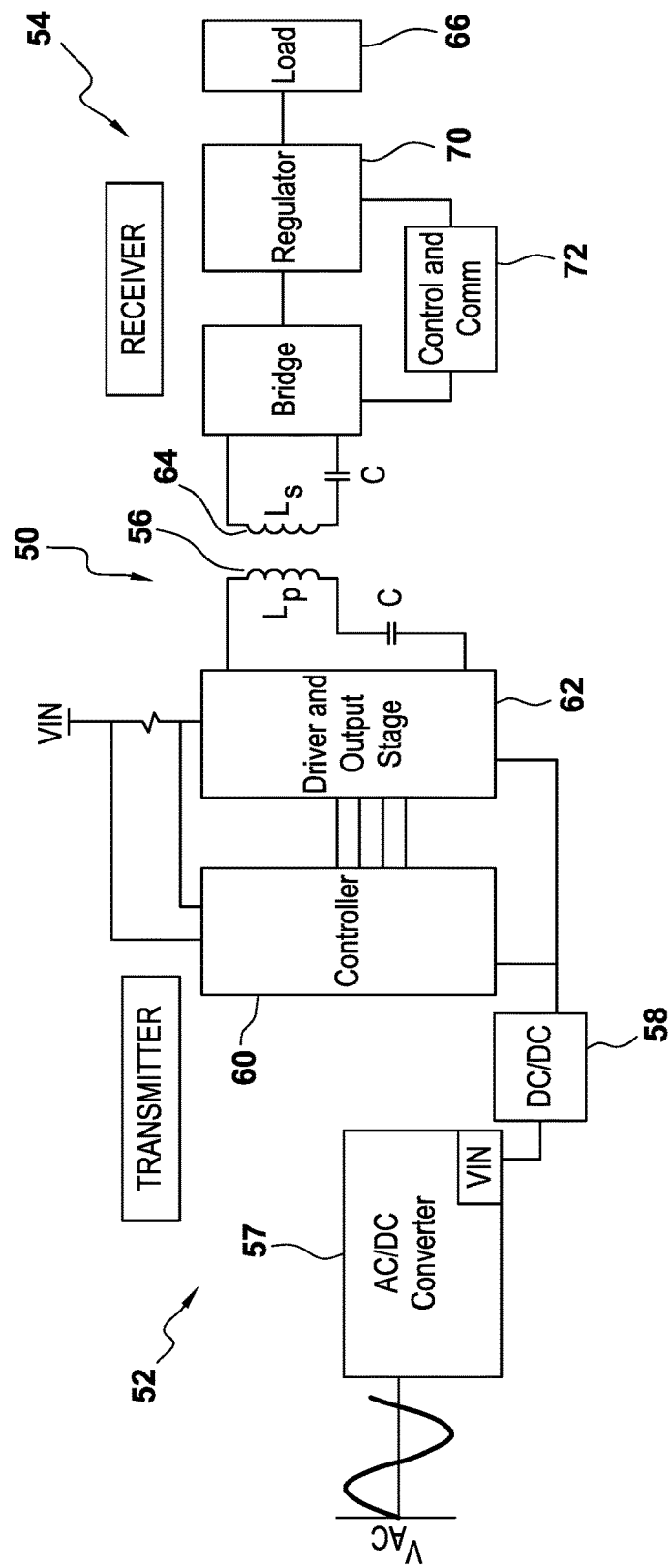
FIG. 10 is a block diagram of an exemplary charging circuit incorporated in the inductive wireless charging station shown in FIG. 1.

Referring to FIG. 10, an exemplary charging circuit 50 shown as a block diagram is disclosed. The circuit has a transmitter 52 and a receiver 54.

The transmitter 52 includes a coil 56, which is disposed inside the housing 8. Power to the coil 56 is supplied through an AC/DC converter 57, a DC/DC converter 58, a controller 60 and a driver and output stage 62. The DC/DC converter 58 provides power to the controller 60 and the stage 62. The controller 60 is a microcontroller, which provides the necessary control signals and algorithms to regulate power transfer following WPC, PMA and Fast Charging protocols. The driver and output stage 62 provides power processing at high frequency using a full bridge chopper circuit.

The receiver 54 is incorporated in the portable electronic device 44. A coil 64 electrically couples with the coil 56 to effect power transfer to a load 66, which is the battery charger inside the device 44. Power flows through a bridge 68, which consists of four diodes that form an AC high frequency to DC rectifier. A regulator 70 provides control to regulate the voltage output of the receiver 54. A control and communication 72 receives information from the regulator 70 and communicate the demand back to the transmitter 52.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A stand and charging coil housing, comprising:
   a) a base;
   b) a frame removably attached to the base;
   c) a housing for a charging coil, the housing is removably attached to the frame;
   d) the base includes a slot; and
   e) the frame is removably received in the slot.

2. The stand and charging coil housing as in claim 1, wherein:
   a) the slot is U-shaped; and
   b) the frame includes a U-shaped bottom portion receivable in the slot.

3. The stand and charging coil housing as in claim 2, wherein the U-shaped bottom portion includes buttons receivable in respective depressions in the slot.

4. The stand and charging coil housing as in claim 1, wherein the slot is inclined such that the frame attached to the slot is inclined away from a user.

5. The stand and charging coil housing as in claim 1, wherein the base is wedge-shaped such that the frame attached to the slot is inclined away from a user.

6. The stand and charging coil housing as in claim 1, wherein:
   a) the frame has an opening defined by opposed first vertical member and a second vertical member and opposed upper member and a lower member;
   b) the first vertical member and the second vertical member include respective first vertical series of grooves and second vertical series of grooves facing into the opening; and
   c) the housing includes a left side and a right side having first vertical series of grooves and second vertical series of grooves meshable with the first series of vertical grooves and the second vertical series of grooves of the frame.

7. The stand and charging coil housing as in claim 6, wherein the first vertical series of grooves and the second vertical series of grooves of the housing are vertically selectively meshable with the first vertical series of grooves and the second vertical series of grooves of the frame.

8. The stand and charging coil housing as in claim 6, wherein the housing includes a left side flange and a right side flange engageable with the first vertical member and the second vertical member.

9. The stand and charging coil housing as in claim 1, wherein a bottom portion of the frame receivable in the base is disposed at an angle with respect to an upper portion of the frame.

10. The stand and charging coil housing as in claim 9, wherein:
    a) the base includes a slot; and
    b) the bottom portion of the frame is removably receivable in the slot in a first orientation or a second orientation which is 180° rotated from the first orientation.

11. The stand and charging coil housing as in claim 1, wherein:
    a) the base includes a top surface;
    b) the slot is disposed below the top surface for receiving a bottom portion of the frame; and
    c) a groove above the top surface for receiving a bottom portion of a portable electronic device when resting against the housing for charging.

12. An inductive wireless charging station for a portable electronic device, the inductive wireless charging station comprising:
    a) a stand including a base and a frame removably attached to the base;
    b) a housing removably attached to the frame;
    c) a transmitter coil for coupling with a receiver coil in the portable electronic device, the transmitter coil is disposed in the housing; and
    d) a power source operably connected to the transmitter coil.

13. The inductive wireless charging station as in claim 12, wherein the power source to the transmitter coil is not attached to the frame or the base.

14. The inductive wireless charging station as in claim 12, wherein the housing is separable from the frame and placeable flat on a flat surface to allow the portable electronic device to rest on top of the housing.

\* \* \* \* \*